(12) United States Patent
Raymond

(10) Patent No.: US 6,330,823 B1
(45) Date of Patent: *Dec. 18, 2001

(54) PROCESS AND APPARATUS FOR TESTING CONTAINERS

(75) Inventor: Samuel O. Raymond, Rockport, MA (US)

(73) Assignee: Benthos, Inc., North Falmouth, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,369

(22) Filed: Jan. 13, 1998

(51) Int. Cl.$^7$ ............................... G01M 3/32; F16J 12/00
(52) U.S. Cl. ................................. 73/52; 73/41; 73/41.4; 73/45.3; 73/45.4; 73/49.8
(58) Field of Search .................................. 73/49.3, 49.2, 73/40.7, 52, 41, 41.4, 45.3, 45.4, 49.8; 209/73; 340/605

(56) References Cited

U.S. PATENT DOCUMENTS

| | | | | |
|---|---|---|---|---|
| 597,233 | * | 1/1898 | Asche | 73/52 |
| 1,694,828 | * | 12/1928 | McClatchie | 73/52 |
| 1,712,909 | * | 5/1929 | Tevander | 73/41 |
| 3,751,972 | * | 8/1973 | Hass | 73/45.4 |
| 4,706,494 | * | 11/1987 | Creed et al. | 73/49.3 |
| 4,709,578 | * | 12/1987 | Iwasaki et al. | 73/49.3 |
| 4,747,298 | * | 5/1988 | McDaniel | 73/52 |
| 4,747,299 | * | 5/1988 | Fox | 73/52 |
| 4,774,830 | * | 10/1988 | Hulsman | 73/49.3 |
| 4,862,732 | * | 9/1989 | Raymond et al. | 73/45.4 |
| 4,899,574 | * | 2/1990 | Potteiger | 73/52 |
| 4,930,345 | * | 6/1990 | Bausch | 73/49.3 |
| 5,025,657 | * | 6/1991 | Schenk | 73/49.2 |
| 5,111,684 | * | 5/1992 | Stauffer et al. | 73/49.3 |
| 5,307,139 | * | 4/1994 | Tyson, II et al. | 356/35.5 |
| 5,614,661 | * | 3/1997 | Balordi | 73/49.3 |
| 5,668,307 | * | 9/1997 | Wade | 73/41 |

FOREIGN PATENT DOCUMENTS

| | | | |
|---|---|---|---|
| 3725739 | * | 8/1987 | (DE) . |
| 577454-A2 | * | 6/1993 | (EP) . |
| 0021790 | * | 2/1979 | (JP) .................. 73/52 |
| 59-44637 | * | 3/1984 | (JP) . |
| 77633 | * | 3/1990 | (JP) . |

OTHER PUBLICATIONS

Translation of JP 59044637A (Kishimoto) to inventor Hisai-chi Shibazaki, pp. 1–15 and original document.*

* cited by examiner

Primary Examiner—Hezron Williams
Assistant Examiner—Michael Cygan
(74) Attorney, Agent, or Firm—Francis J. Caufield

(57) ABSTRACT

The fluid tightness of containers having a first deformable section and a second deformable section spaced from the first deformable section is checked by changing the pressure applied to the first deformable section, preferably without causing fluid to flow through the first deformable section out of the container, and without changing the pressure applied to the second deformable section, thereby causing a deformation of the first deformable section and a change in pressure within the container; and thereafter monitoring a predetermined characteristic, preferably the position, of the second deformable section. This process can be used to check the fluid tightness of the containers with relatively fragile seals, for example, a foil lid of a food container without mechanical contact. Automated apparatus for carrying out this process is described.

11 Claims, 3 Drawing Sheets

PROCESS AND APPARATUS FOR TESTING CONTAINERS

BACKGROUND OF THE INVENTION

This invention, in general, relates to a process and apparatus for testing containers. More specifically, this invention relates to a process and apparatus for testing the fluid tightness of containers. This invention is especially, but not exclusively, intended for use in testing containers comprising a container body having an aperture which is sealed by a lid.

In many industries, it is important to test the fluid tightness of containers. For example, in the food industry, it is essential to ensure that containers in which foodstuffs are packed are completely sealed to ensure that the foodstuffs are in good condition, free from molds, bacteria and other pathogenic organisms, so that they will be safe when used by consumers. The pharmaceutical industry similarly requires that containers for medications, especially solutions intended for injection or intravenous administration, be protected from contamination or serious danger to public health may result.

Because fluid tightness of containers is not readily ascertained by visual inspection, various attempts have been made to provide apparatus for testing fluid tightness (hereinafter, for convenience, called "leak detection apparatus.") For example, U.S. Pat. No. 4,862,732 describes a "squeezing apparatus" for testing the fluid tightness of plastic bottles, such as those in which laundry detergents are commonly sold. This apparatus creates a pressure within the bottle by squeezing it by means of a pneumatic cylinder. It monitors the position of the piston of this cylinder; if the bottle does not leak, the piston will stop as soon as the pressure in the bottle increases enough to balance the force of the piston. After equilibrium, continued pressure caused by the squeezing will diminish as pressurized gas within the bottle leaks, and thus the piston of the pneumatic cylinder will move further than in the case of a non-leaking bottle.

The apparatus described in this patent gives good results under commercial conditions with the bottles for which it was designed. However, there are several types of commercial container products which cannot be tested by such squeezing apparatus. For example, yogurt is often sold in frusto-conical or inverted frusto-conical (i.e., with a lid wider than the base) containers having a base, a lid which seals an aperture at the upper end of the container, and sloping sides connecting the base to the lid. If one attempts to test the fluid tightness of such inverted frusto-conical containers using he apparatus described in the aforementioned patent, the sloping sides allow the container to slide upwardly relative to the pneumatic cylinder, thus placing a smaller diameter section of the container adjacent the piston, allowing the piston to move forwardly, and disturbing the reading, since the apparatus interprets the forward movement of the piston as indicating a leak in the container. Also, the plastic material conventionally used to form such containers is much thinner and are fragile than that used in plastic detergent bottles, and such thin plastic often buckles or becomes permanently creased if such containers are tested in the apparatus described in the aforementioned patent. Similarly, some berries are commonly sold in flat, semi-rigid plastic trays formed from thin plastic film and sealed with a foil or plastic membrane lid. These trays are unsuitable for testing in a squeezing apparatus since the tray is too rigid and shallow to be squeezed horizontally, and the lid is too fragile to permit vertical squeezing.

Several forms of leak detection apparatus are known which do not rely on squeezing the container. In one form of such apparatus, the container to be tested is placed within a fluid tight chamber, the pressure within the chamber is changed from atmospheric to above or below atmospheric, and the effect of this pressure change on the container is monitored. For example, U.S. Pat. No. 3,751,972 (Hass) describes a leak detector for testing sealed containers formed of semi-rigid or flexible material. The container to be tested is placed in a chamber which is thereafter pressurized at a pressure distinctly different from the internal container pressure, whereby the container is caused to physically distort. A container dimension is first sensed before the chamber is pressurized to produce a first signal representing the dimension resulting from the difference between container internal pressure and atmospheric pressure, this first sign al being held. When the container is under pressure in the chamber and a predetermined time interval has elapsed, the container dimension is again sensed to produce a second signal representing the dimension as a result of the difference between internal pressure and chamber pressure. The first held signal and the second signal are compared and if the disparity therebetween indicates a significant change in dimension, the container is accepted, whereas if there is little disparity between the signals, the container is rejected.

Similarly, U.S. Pat. No. 5,105,654 (Maruyama et al.) describes an apparatus which is generally similar to that of Hass but in which at least a portion of the container being tested comprises an electrically conductive material, and the chamber is provided with an eddy-current displacement sensor to detect the position of the conductive material of the container.

U.S. Pat. No. 5,365,774 (Horlacher) also describes an apparatus which is generally similar to that of Hass but in which the chamber is equipped with a suction cup at the end of a suction pipe. This suction cup is placed above the flexible cover of the container being tested. When the pressure in the chamber is reduced, the cover bulges and blocks the suction cup. If the seal between the cover and the body of the container is ineffective, the lid does not bulge and block the cup, thus enabling the ineffective seal to be detected.

U.S. Pat. No. 5,513,516 (Stauffer) describes a method and apparatus in which a flexible or semi-flexible package is received within a closeable test cavity, and a pressure differential is established between the inside of the container and an enclosed space within the test cavity outside of the container. The closeable test cavity comprises a flexible wall whose shape adapts to the shape of the container, at least when the pressure differential is established. The flexible wall advantageously compensates for variations in head space and shape of the packages, as when the contents are not uniformly distributed within the package. The flexible wall can sealingly contact a portion of the container spaced from a container seal to permit detection of seal leaks. A gas permeable, flexible screen can be employed between the container and the flexible wall to permit leak detection of leaks in the container beneath the flexible wall.

Similarly, U.S. Pat. No. 4,055,984 (Marx) describes a device for detecting leaks in an article having readily deformable walls. This device has conventional arrangements for performing a leak detection by overpressure or by vacuum and has a deformable backup wall for engagement with the walls of the article. The backup wall is, on its face oriented towards the article, so configured that between the backup wall and the article there is obtained a coherent fluid tight space which may be evacuated.

The leak detection devices just described suffer from one serious problem when used in commercial settings. Food packages for retail sale, and similar relatively low cost packages, are normally filled on continuous packing lines which run at high speeds, typically at least 30 packages per minute, and it is highly desirable to conduct the leak detection procedure in-line with the packing line. Removing one or two packages from such a packing line, placing them within a vacuum chamber, resealing and applying a vacuum to the chamber, effecting the desired measurement on the package(s), restoring the chamber pressure to atmospheric, opening the chamber and removing the package(s) will in total take at least several seconds. Thus, it is difficult to carry out the leak detection procedure with a throughput sufficient to keep up with the packing line. Although multiple sets of leak detection apparatus can of course be used with a single packing line, the provision of such multiple sets, together with the necessary apparatus for directing packages to the proper leak detection apparatus, and reassembling the packages into a single stream after leak detection, greatly increases the complexity and cost of the packing line.

U.S. Pat. No. 4,774,830 (Hulsman, assigned to the same assignee as the present application), describes a leak detention apparatus which operates on a rather different principle from those previously described. The Hulsman apparatus is used in detecting defective flange-shaped seals between lid and body portions of a package. A pressure chamber is provided for isolating the external edge of the seal and applying a test pressure thereto. Containment of the pressure chamber includes sealing pressure applied mechanically to the flange-shaped package seal during testing. If the seal is defective, gas flows in one direction between the pressure chamber and interior of the package, thus causing a displacement of the lid of the package, and this displacement of the lid is detected by a position detector disposed adjacent a central portion of the lid, this central portion of the lid lying outside the pressure chamber and thus being maintained at ambient pressure. This Hulsman apparatus is effective in detecting leaks and better adapted than the apparatus previously discussed for use in-line with a packing line, since the Hulsman apparatus does not require removal of each package from the line and placement of the whole container within a pressure or vacuum chamber. The pressure chamber of the Hulsman apparatus is formed by two separate members which can close, clamshell style, on a package which is already resting on a transport conveyor or similar device. However, the Hulsman apparatus does require that the seal be placed within a pressure chamber. In addition, there is some risk of mechanical damage as a fragile lid is grasped between the members forming the pressure. Also, the process will not detect a leak located anywhere except in the lid sealing area, for example, in the lid or in the cup.

Accordingly, it is a primary object of the present invention to provide a process and apparatus for testing the fluid tightness of a container which, like the Hulsman process and apparatus, does not require placement of the entire container within a vacuum or pressure chamber. However, unlike the Hulsman process and apparatus, the present process and apparatus also does not require placing a portion of the lid of the container within a pressure chamber, and it tests the entire container for leaks, not just the lid to cup sealing area.

Other objects of the invention will, in part, be obvious and will, in part, appear hereinafter when the description to follow is read in conjunction with the drawings.

SUMMARY OF THE INVENTION

Accordingly, this invention provides a process for testing the fluid tightness of a container having a first deformable section and a second section spaced from the first deformable section and capable of undergoing a characteristic change, such as a deformation, shape alteration, or displacement, in the presence of an applied disturbance, such as a pressure change. The process comprises the steps of:

(a) changing the pressure applied to at least part of the outer surface of the first deformable section, preferably without causing fluid to flow through the first deformable section out of the container, and without changing the pressure applied to the outer surface of the second deformable section, thereby causing a deformation of the first deformable section and thus a change in the pressure within the container; and (b) monitoring the second deformable section to detect a characteristic change in it, such as in its position, at at least one time later than that at which step (a) is carried out. Monitoring may begin prior to changing the pressure as in step (a) and occur continuously for a predetermined interval while the pressure change is applied and even before or after it has been applied or removed from the first deformable section.

In a preferred variant of this process, the container has a substantially planar, flexible base, and a sidewall secured to he base in a substantially fluid tight manner and extending out of the plane of the base, the sidewall defining an aperture disposed at the opposed end of the container from the base. The container also comprises a flexible lid secured to the sidewall so as to substantially close the aperture, and the process comprises the steps of (a) engaging a sealing member with a peripheral portion of the base so as to form a seal which extends around the periphery of the base;

(b) changing the pressure applied to a predetermined, preferably central, portion of the base, the area of the base inside of the inboard peripheral edge of the seal, without changing the pressure applied to the lid, thereby causing a deformation of the base and thus a change in the pressure within the container; and (c) detecting the position of at least part of the lid at at least two separate times after that at which step (b) is carried out, and preferably at least once prior to carrying out step (b).

This invention also provides apparatus for testing the fluid tightness of a container having a first deformable section and a second deformable section spaced from the first deformable section. The apparatus comprises: means for changing the pressure applied to at least part of the outer surface of the first deformable section without causing fluid to flow through the first deformable section out of the container and without changing the pressure applied to the outer surface of the second deformable section thereby causing a deformation of the first deformable section and thus a change in the pressure within the container to cause a deformation of the second deformable section; and means for monitoring the position of at least part of the second deformable section.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION OF THE INVENTION

Figure 1:
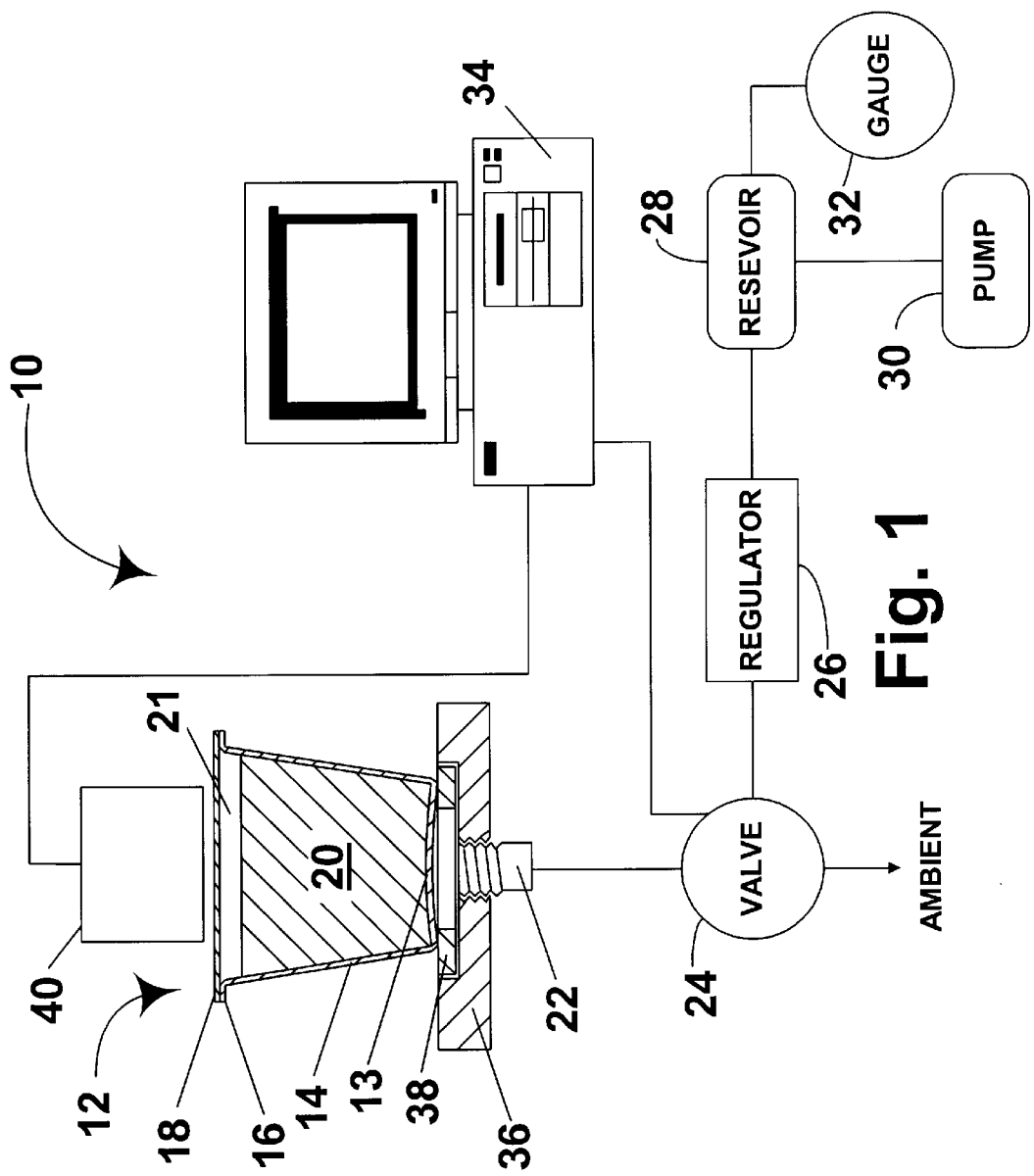
FIG. 1 illustrates diagrammatically, in block diagram form, a first embodiment of the present invention suitable for off-line testing individual containers.

As already mentioned, the present process and apparatus tests the fluid tightness of a container having spaced first and second deformable sections. The pressure applied to at least part of the outer surface of the first deformable section is changed, thus causing a deformation of this section and a change in pressure within the container. Thereafter, the position of at least part of the second deformable section is preferably measured continuously over a predetermined interval but at least once. Alternatively, other characteristics of the second deformable section that are related to its deformation may be measured. For example, its shape, rate of change of deformation over some measurement period or window, slope, radius of curvature, or the like may be effectively used in place of just deformation or in combination with it.

It will be apparent to those skilled in the packaging art that the physical characteristics of the two deformable sections may vary depending upon the pressure change applied to the first deformable section and the sensitivity with which the position of the second deformable section is measured. Most plastic and paper containers are made of material which is inherently sufficiently deformable for the present process to be useful, but some thin metal containers, for example made from aluminum or tinplate, may also be suitable for use in this process. Furthermore, stating that the container has spaced first and second deformable sections does not exclude the possibility that the whole of the container may be made of materials which are inherently deformable.

The change in pressure applied to the first deformable section in the present process may be either an increase or a decrease in pressure, but desirably this change is from substantially atmospheric pressure to a sub-atmospheric pressure. If the pressure change is an increase in pressure and the container has a leak at a point on the container which is in direct contact with its contents (for example, if the leak were in the lower part of a side seam of a yogurt container below the level of the yogurt surface), it is possible for a small quantity of the contents to be expelled through the leak. Although the leaking container itself would be rejected, the leaked contents could contaminate the leak detection apparatus, and possibly containers tested in the same apparatus later. While the public health risk from smearing of such leaked contents on to the outside of other containers is small, the smears are likely to offend customers, and thus reduce customer acceptance of the product. A more serious possibility for damage can occur where a container is filled with a caustic material (e.g., bleach) that can squirt out under the foregoing circumstances.

Any known method may be used to create the pressure change in the present process. However, for simplicity, it is generally preferred that the means for effecting the pressure change be a pipe having an open end arranged to abut the first deformable section of the container and a control unit (for example, a vacuum pump, vacuum reservoir, regulator, and a valve) arranged to create either substantially atmospheric pressure or a sub-atmospheric pressure within the pipe. To ensure that the pressure applied to the first deformable sect on is consistent from one container to the next, it is desirable to provide a sealing member (such as a gasket of elastomeric material) surrounding the open end of the pipe. This sealing member desirably engages a peripheral portion of the firs deformable section so as to form a seal which surrounds a predetermined central portion of the first deformable section, so that the pipe applies the pressure change to this central portion. The area of the central portion is preferably made as large as possible to optimize the deformation of the first deformable section and hence the internal pressure change of the container.

In considering when and how often to detect the position of the second deformable section during the present process, it is necessary to consider the full range of possible types of leaking container from gross to slow leakers. Some containers may have a gross leak; for example, a container lid may have been treated with a faulty batch of adhesive so that the lid is only secured to the body of the container over part (say half) of the lid is periphery. When such a grossly leaking container is subjected to the present process, the pressure change applied to the first deformable section does not cause any substantial change in pressure within the container, since essentially instantaneous movement of air through the gross leak occurs, and no substantial movement of the second deformable section occurs (i.e., the change in internal container pressure is zero). Other containers may have a small leak, for example a pinhole accidentally formed a foil lid or in the peripheral seal. When such a slightly leaking container is subjected to the present process, the pressure change applied to the first deformable section does cause a substantial change in pressure within the container, and the second deformable section undergoes essentially the same movement as for a non-leaking container. However, thereafter slow movement of air through the small leak gradually causes the pressure within the container to revert to atmospheric, and consequently the second deformable section gradually returns to the position it occupied before the pressure change occurred.

Accordingly, it will be apparent that in principle both grossly leaking containers and slightly leaking containers, along with intermediate types, can be detected by measuring the position of the second deformable section, or other characteristic related to its deformation, over some predetermined time period after the pressure change occurs, since at this time the deformable sections of both grossly leaking containers and slightly leaking containers will be in a position measurably different from that of the second deformable sections of non-leaking containers. The second deformable sections of grossly leaking containers will show no deviation from their position prior to the pressure change, while the second deformable sections of slightly leaking container will fall within a predictable range of deviation from that of the second deformable sections of non-leaking containers. Thus, during this interval, both grossly leaking and slightly leaking containers may be eliminated by rejecting any container whose second deformable section displays a deviation less than some predetermined value, for example, three-fourths of the deviation expected from a non-leaking container. Preferably, the deviations or other changes in properties related to deviations, are monitored just prior to the application of pressure as well to establish a reference and/or to detect the presence of a container in the measurement station. However, it should be noted that, in practice, it may not be necessary to measure the "undeviated" position of the second deformable section of each container prior to the pressure change where modern container manufacturing techniques often allow containers to be produced with such precision that variations in the undeviated position between successive containers passing along a packing line are minimal, and substantially less than the deviation which the second deformable section of and non-leaking container will experience during the present process. Accordingly, measuring the undeviated position of one container (or, better, measuring this position for several containers and taking the average) provides an accurate indication of the undeviated position for all succeeding containers where the process is well-behaved and produces negligibly varying container lids.

However, in the practice of the present process, it is generally preferred that the position of the second deformable section be measured continuously from a time prior to when the vacuum is applied to a time after the vacuum is released. During this measurement interval, a continuous signal is preferably generated and monitored (preferably using digital sampling techniques) for the presence of characteristics indicative of gross leakers, slow or intermediate leakers, and acceptably sealed containers. Gross leakers will obviously be indicated early in monitoring the generated signal and may be detected by early measurements occurring in a very short time (e,g, about 0.2 seconds) after the pressure change by finding the containers which fail to display any significant deviation of the second deformable section. Subsequent measurements are preferably made at regular sampling intervals using digital sampling techniques over a longer period (typically about 1 to 4 seconds) after the initial measurements, and comparison of the initial and subsequent measurements are used to detect slightly leaking containers for which there will be a significant difference between the successive measurements, which can also include one or more measurements after the pressure has been removed to generate additional information for assessing the leakiness of a container. In high speed production environments, it is preferable to provide a means for detecting the presence of a container in the measurement station before applying the vacuum, and this may be done by monitoring for the presence of a lid after a container is expected to be present in the measurement station. This may be achieved in a manner to be described in connection with apparatus for practicing the invention.

As already indicated, typically the present process will be carried out on containers which comprise a container body having at least one flexible portion which serves as the first deformable section, and walls defining an aperture in the container body, the container further comprising a flexible lid secured to the container body so as to substantially close the aperture therein, and at least part of the flexible lid serving as the second deformable section. In most cases, the flexible lid will be nominally planar, and the container body will comprise a substantially planar base lying substantially parallel to the flexible lid, an at least one sidewall connecting the base to the lid with at least part of the base serving as the first deformable section.

Any known type of position detecting apparatus may be used to carry out the measurement of the position of the second deformable section in the present process. Thus, the position detecting means of the present apparatus may be, for example, a proximity detector arranged to sense the position of the second deformable section of the container, an optical rangefinder arranged to sense the position of the second deformable section of the container, an acoustic detector, radar, a mechanical contact arranged to engage the second deformable section of the container, or an optical imaging system (one or two-dimensional array) coupled with image processing means for evaluating change in the image of the lid formed at different times. In the case of a proximity type detector, the detector may of the type that collects information over an area of finite dimensions so that the signal generated from this area represents an integration of the behavior of the second deformable section under the sampling area and therefore the displacement sensed may be of a net change in deformation weighted over the sensing area.

Preferred process and apparatus of the present invention will now be described, though by way of illustration only, with reference to the accompanying drawings.

FIG. 1 shows diagrammatically a simple apparatus (generally designated 10) of the invention which can be used to test a small sample of containers, for example in an off-line laboratory attached to a food processing plant. Each container (generally designated 12) has s substantially the form of a cup (i.e., an inverted frusto-conical shape) and comprises a circular base 13, which can be slightly convex upwardly (exaggerated for illustrative purposes) or nominally flat; the portion of this base 13 corresponding to the area over which the vacuum is applied serves as the first deformable section during the testing process. Each container 12 also comprises a conical sidewall 14 which is integral with, and extends upwardly and outwardly from, the periphery of the base 12. A narrow annular flange 16 extends outwardly from the upper edge of the sidewall 14, leaving a circular aperture within this flange 16. A flexible lid 18, formed from a metal foil or plastic membrane, is adhesively secured to the flange 16 and thus closes the circular aperture inside the flange 16. The adhesive seal between the lid 18 and the flange 16 is the most likely point of leakage in such a container. Most of the interior space within the container 12 is filled with a foodstuff (for example yogurt) 20, leaving a small head space 21 containing gas, typically nitrogen but sometimes air, at essentially atmospheric pressure. While any sensible portion of the lid 18 may serve as the second deformable section, it is preferable that the central section of the lid 18 serve as the second deformable section of the container 12 during the present process.

As shown in FIG. 1, the apparatus 10 comprises a pressure changing means in the form of a pipe 22, which is connected to a three-way solenoid valve 24, this valve in turn being connected to a vacuum regulator 26, a vacuum reservoir 28 and a vacuum pump 30, with a vacuum gauge 32 being connected to the reservoir 28. The valve 24 is controlled by a control means in the form of a programmed computer 34 or equivalent microprocessor or other suitable dedicated components programmed for this purpose.

The upper end of the pipe 22 is engaged by means of mating screw threads with a circular plate 36; this plate 36 being provided with a circular recess in its upper surface with an elastomeric annular gasket 38 is fitted within this recess. The central aperture in this gasket 38 communicates with the open upper end of the pipe 22. The inboard peripheral edge of the aperture through gasket 38 is preferably made outboardly as far as possible to provide the largest surface area over which the vacuum is applied to the bottom of the container. This is done to optimize the pressure change that will occur in container 12 which in turn will have the largest effect on lid 18.

Finally, the apparatus 10 comprises a position detecting means in the form of at least one proximity sensor 40, the output from which is fed to the computer 34. The sensor 40 is disposed above the upper end of the pipe 22 by a distance such that when the base 13 of a container 12 is resting on the gasket 38, the sensor 40 lies adjacent the lid 18 of the container. Proximity sensor 40 preferably "averages" over a predetermined area of lid 18, which is preferably made as large as impossible consistent with commercial availability for such devices.

The apparatus 10 is used in the following manner to carry out the process of the invention. While the valve 24 is set to connect the pipe 22 directly to the atmosphere or ambient pressure, an operator manually places a container 12 on the gasket 38 and presses a control key on the computer 34 to initiate the testing sequence. The computer first senses the position of the lid and then activates the valve 24 so that a partial vacuum is formed within the pipe 22. This partial vacuum is applied to the base 13 of the container 12, thus causing the peripheral portion of the base to sealingly engage the gasket 38, and also to apply the partial vacuum to the central portion of the base 13, thereby causing a change in pressure on this central portion, which had previously been at atmospheric pressure. The resultant reduction in pressure causes the flexible base 13 to deform downwardly thus causing a reduction in pressure within the container.

The computer 34 continuously monitors the position of the central portion of the flexible lid 18. This is typically over a 1 to 4 second measurement period, after the partial vacuum is applied to the base of the container. The computer 34 operates the valve 24 so that the pipe 22 gain becomes connected directly to atmosphere, thereby releasing the partial vacuum beneath the base of the container and permitting the removal of the container.

If the container 12 is properly sealed, this reduction in pressure within the container will cause some portion of the flexible lid 18 to deflect downwardly and to remain in this position as long as the partial vacuum is maintained. Accordingly, measurements by the sensor 40 will show substantial downward deflection of the lid 18, and upon comparing the measurements before, during, and after the application of the vacuum to the bottom of the cup, the computer 34 can indicate (for example by a green light or the like) that the container is properly sealed and non-leaking.

If, however, there is a gross failure of the seal between the lid 18 and the flange 16, the downward deflection of the base of the container caused by the partial vacuum within the pipe 22 will cause in immediate influx of air into the container, and essentially no downward defection of the lid 18 will occur. Accordingly, upon taking measurements from the sensor 40, the computer 34 can determine that the lid 18 did not deflect downward when vacuum was applied to the base of the container and therefore conclude that the container has a gross leak. This conclusion can be displayed by an appropriate indication on the computer monitor, and the testing process can be terminated, or the gross leak can be confirmed by noting that the lid did not rise when vacuum was removed from the base of the container (a double check).

If there is only a small failure of the seal between the lid 18 and the flange 16, the downward deflection of the base of the container caused by the partial vacuum within the pipe 22 will initially cause essentially the same downward deflection of the lid as in a non-leaking container, and early measurements from the sensor 40 after the vacuum is applied will be essentially the same as that for a non-leaking container. However, as the partial vacuum is maintained, air will gradually flow into the container through the small leak, and pressure within the container will increase, and thus the downward deflection of the lid will decrease. Accordingly, subsequent measurements from the sensor 40 will show a deflection substantially less than that of the first measurement, and the computer 34 will indicate a faulty container.

Figure 2:
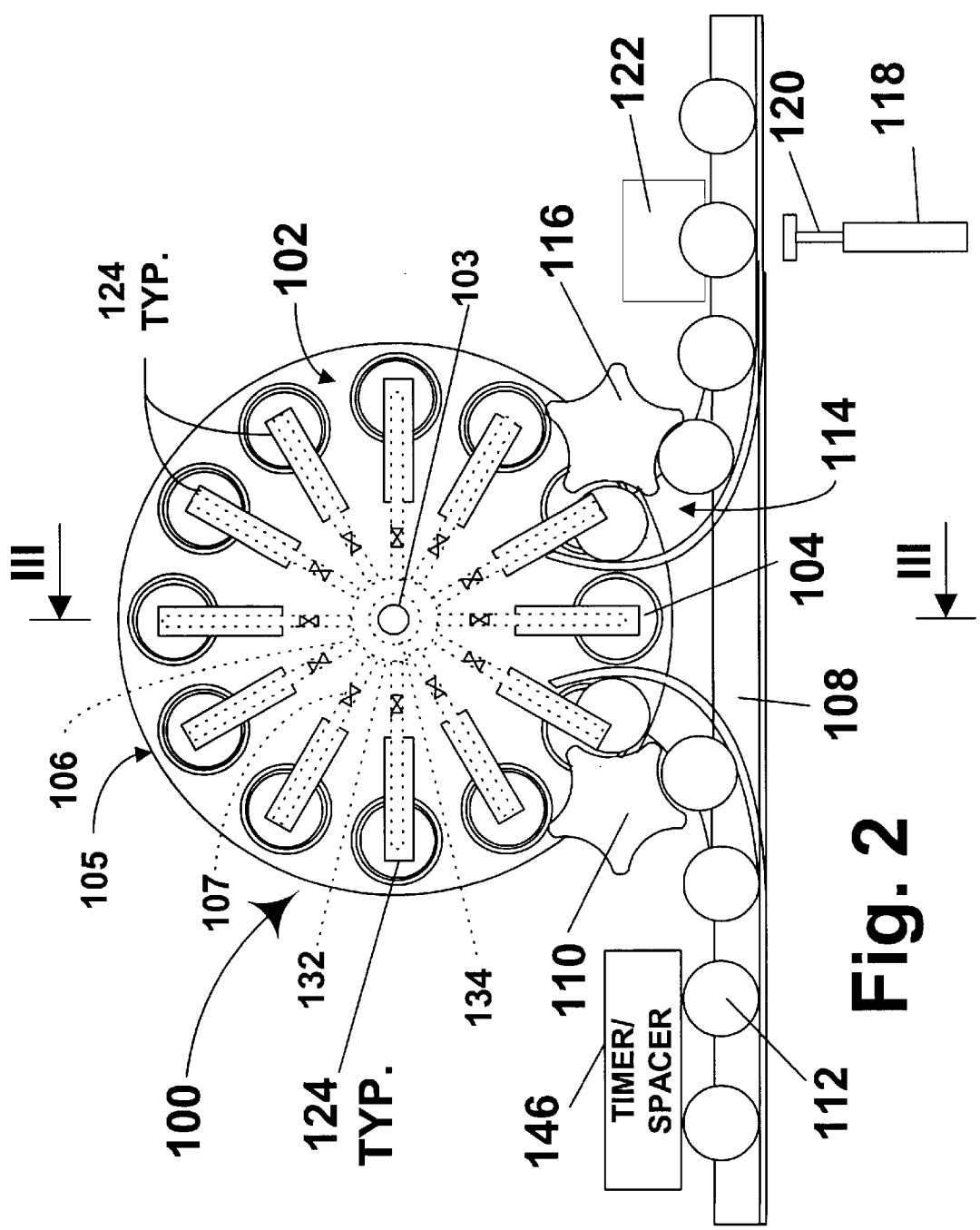
FIG. 2 is a simplified diagrammatic top plan view of a second embodiment of the present invention intended for use on a production packing line.
Figure 3:
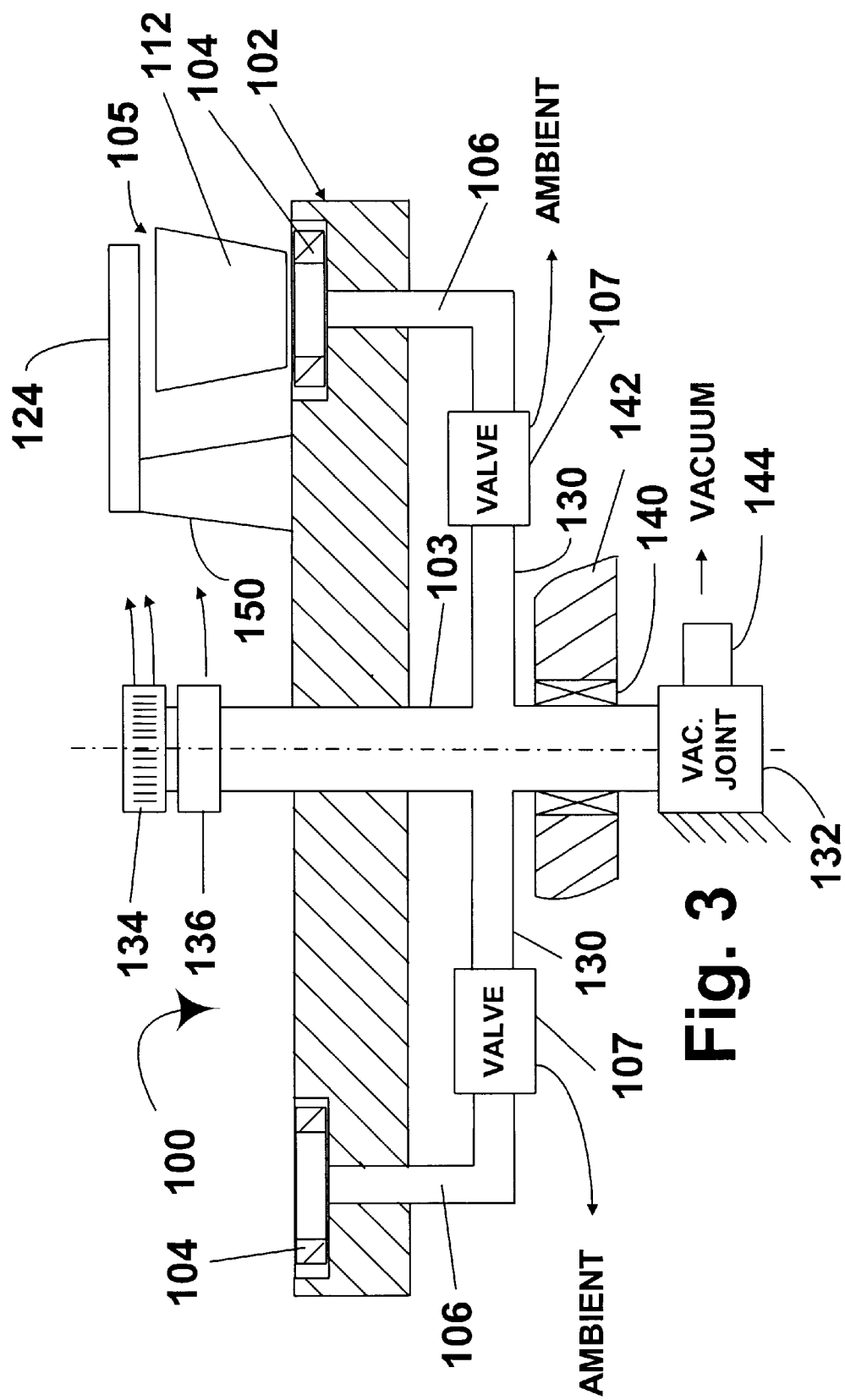
FIG. 3 is an enlarged diagrammatic section along the line III—III in FIG. 2 showing the construction of the carousel of the apparatus shown in FIG. 2 absent selected parts for purposes of clarity.

FIGS. 2 and 3 show an apparatus of the invention which is more sophisticated than that shown in FIG. 1 and is intended in-line for use with a packing line. The apparatus (generally designated 100) shown in FIGS. 2 and 3 comprises a rotatable support member or carousel 102 mounted for rotation about a central vertical shaft 103 (extending normal to the paper in FIG. 2). Twelve container support stations designated typically at 105 are disposed at equal intervals around the periphery of the carousel 102, each of these stations comprising a circular recess into which is fitted an annular elastomeric gasket 104 similar to the gasket 38 shown in FIG. 1; as best seen in FIG. 3. From each station 105 a bore 106 extends from adjacent the central aperture in the gasket 104 to the lower surface of the carousel 102 from which it is connected to a three-way solenoid valve 107 under control of a computer such as 34. Two such bores 106 and valves 107 are shown in FIG. 3 but in reality there is such a bore and valve corresponding to each station on carousel 102 as best seen in FIG. 2.

As best seen in FIG. 3, a further tore 130 connects respective ones of valves 107 to a well-known rotating vacuum joint 132 which in turn is connected to a vacuum regulator similar to that shown at 26. Vertical shaft 103 is mounted in a bearing 140 fixed in a plate or pedestal 142 (only partially shown), and is bored out to connect bores 130.

Referring now to FIG. 2, a conveyor 108 adjacent the periphery of the carousel 102 transports containers 112. A star wheel 110 (of a type well-known to those skilled in food packaging machinery technology) is disposed adjacent the end of an intake station to carousel 102 to remove containers from conveyor 108 for inspection. The wheel 110 is driven synchronously with the carousel 102 so that each container 112 passing along the conveyor 108 is centered on one of the gaskets 104. In this connection, a well-known timing/spacing device 146 (e.g. a well-known screw type) is positioned upstream to regulate the spacing between successive containers to assure that they are not punctured by the points on star wheel 110, and carousel 102, star wheel 110 and 116, device 146, and shaft 103 all rotate in synchronization because they all are driven by a common drive. The use of the shaft encoder 134 assures that valves 107 open and close at the correct time.

A downstream exit station 114 begins adjacent the periphery of the carousel 102, and a star wheel 116, similar to the star wheel 110, is disposed adjacent the exit station 114 and is driven synchronously with the carousel 102 so that each container 112 approaching exit station 114 is transferred smoothly to the conveyor 108 for subsequent downstream processing. The exit station 114 is provided with a rejection device in the form of a pneumatic cylinder 118 having a piston 120 which can move horizontally across the exit station 114 so as to displace a specific container 112 from conveyor 108 into an adjacent rejection bin 122, without disturbing adjacent containers on the exit conveyor.

A plurality of position sensors (typically designated at 124) are generally similar to the sensor 40 shown in FIG. 1 and are mounted in fixed positions above the carousel 102 and rotate with it so that there is a sensor corresponding to each measurement or container support station 105. Each sensor 124 is mounted above its respective station 105 via a vertical support 150 as shown in FIG. 3 (only one shown for clarity). Wires from each sensor are fed from an electrical slip ring 136 to a central computer as at 34. The sensors 124 are preferably mounted for rotation with carousel 102 to avoid measurement errors due to variations in the position of a container's lid which would otherwise be introduced by undulating movement in the carousel itself with respect to separately mounted sensors.

FIG. 3 shows the manner in which a partial vacuum is applied to the bases of the containers 112 carried on the carousel 102. For ease of illustration, the one container 112 and measurement station 105 shown in FIG. 3 is shown only schematically and not in cross-section, and the other containers 112 and sensors 124 which will normally be present are omitted.

Bore 144, which is generally similar to the pipe 22 shown in FIG. 1, delivers sub-atmospheric pressure via a regulator, vacuum reservoir, vacuum pump and vacuum gauge generally similar to the parts 6, 28, 30 and 32 respectively shown in FIG. 1; these parts are omitted from FIG. 2 and 3 for the sake of clarity. The subatmospheric pressure is delivered via the vacuum joint 132 to valves 107 via their respective bores 130. Valves 107 are controlled via a computer similar to that designated at 34. When a valve 107 is opened, vacuum is delivered to the base of a container via a corresponding bore 106, as using a container is present in a measurement station 105. To assure that valve 107 is properly activated, information from the shaft encoder 134 is used to verify that a container should be present in a measurement station 105 shortly after being loaded on to carousel 102. Afterwards, a corresponding sensor 124 is instructed to sense for the presence of a container lid. If the shaft encoder information and the presence of a container are verified, a valve 107 is instructed to open to draw a vacuum on the base of a container. In this way, the absence of a container in a measurement station can be determined thus preventing an attempt to draw a vacuum directly on the ambient atmosphere thus permitting the apparatus to operate normally even with a missing container(s). Likewise, a valve 107 may be turned off and the vacuum removed with the base returned to ambient pressure when a container approaches star wheel 116 and just before it is removed for introduction back on to conveyor 108.

The sensors 124 and the three-way solenoid valves 107 (not shown) are connected to a control device in the form of a computer (also not shown) similar to the computer 34 shown in FIG. 1.

The apparatus shown in FIG. 2 and 3 operates in the following manner. Each container passing along the conveyor 108 is guided by the star wheel 110 and centered above a gasket 104. At this point, the bore 106 associated with the gasket 104 is at atmospheric pressure. The presence of a container and the position of star wheel 110 with respect to a measurement station are verified. If a container is properly present in the measurement station, valve 107 is opened, and a vacuum is applied to the container bottom. In exactly the same way as previously described with reference to the apparatus of FIG. 1, the sub-atmospheric pressure in the bore 106 causes the periphery of the base of the container to seal against the gasket 104, the central portion of the base to deflect downwardly, the pressure within the container to fall, and the lid of the container to deflect downwardly (assuming the container is properly sealed).

After the pressure within the container has thus been lowered, the rotation of the carousel carries the container along with its respective sensor 124 while the position of the container lid continues to be sensed. The computer compares the position readings from the same container as the container rotates towards star wheel 116. If the readings show a proper deflection of the container lid, the computer takes no action, and the container is allowed to proceed from the carousel 102 via the wheel 116 to the conveyor 108. If, however, one or more of the sensors 124 detect an insufficient deflection (indicating a grossly leaking container) or successive readings of the container from the sensors 124 show a difference greater than a predetermined value (indicating a slightly leaking container), the computer generates an error signal, and after an appropriate delay to allow the container to pass via the wheel 116 on to the conveyor 108 and to reach the pneumatic cylinder 118, cylinder 118 is operated to push the leaking container into the rejection bin 122.

It will be apparent that numerous changes and modifications can be made to the preferred embodiments of the invention described above without departing from the scope of the invention. For example, the computer may readily be provided with software for providing process control information and quality statistics based on the measurements made. Other modifications will readily be apparent to those skilled in the art.

From the foregoing, it will be seen that the present invention provides a process and apparatus which can reliably determine the fluid tightness of containers without requiring placement of the entire container within a pressure or vacuum chamber, and which does not require mechanical contact with the lid of a container. The present process and apparatus can be applied to a wide variety of containers, including containers having fragile lids, and pre erred processes and apparatus of the invention can test each of a stream of containers, such as are produced by a high speed packing line.

What is claimed is:

1. A process for testing the fluid tightness of a plastic container, the plastic container comprising a container body at least partially filled with a fluid and having a flexible base, and walls defining an aperture in the container body, the plastic container further comprising a flexible lid secured to the container body so as to substantially close the aperture therein, the flexible lid being spaced opposite from the flexible base of the container body, the process comprising the steps of:

(a) providing a support member having a support surface and at least one aperture extending from an entrance on said support surface through said support member, and providing a sealing member surrounding said entrance;

(b) providing pressure varying means for varying the pressure in said aperture between substantially atmospheric pressure and a sub-atmospheric pressure;

(c) while the pressure within said aperture is at substantially atmospheric pressure, placing the container on the support member so that a peripheral portion of the flexible base of the container engages the sealing member to form a chamber defined by a predetermined portion of the base of said container and said sealing member, said chamber being in communication with said aperture, but so that the flexible lid is free to move in response to pressure changes within the container;

(d) while the pressure within said aperture and said chamber is still at substantially atmospheric pressure, monitoring a characteristic of a sampling area of the flexible lid with an area detector, said sampling area having finite dimensions such that the signal from said area detector represents the behavior of said flexible lid integrated over said sampling area;

(e) thereafter causing said pressure varying means to change the pressure in said aperture and said chamber to said sub-atmospheric pressure without changing the pressure applied to the outer surface of the flexible lid, thereby causing a deformation of the flexible base and thus a reduction in the pressure within the plastic container; and (f) repeating said monitoring of said characteristic of said sampling area of the flexible lid at at least one time later than that at which step (e) is carried out.

2. A process according to claim 1 wherein said support surface of said support member has a recess formed therein, said sealing member is accommodated within an outer portion of said recess and said aperture is provided within a central portion of said recess surrounded by said sealing member.

3. A process according to claim 2 wherein said sealing member has an exposed surface which is substantially planar and substantially flush with the surrounding portion of said support surface so that said flexible container can be engaged with the sealing member by sliding said flexible container across said support surface.

4. A process according to claim 1 wherein said support member is rotatable and has a plurality of apertures therein, each aperture having a sealing member associated therewith, each aperture also having associated therewith a monitoring means arranged to effect said monitoring, said monitoring means being arranged to rotate with said support member so as to remain in the same position relative to its associated aperture as said support member rotates.

5. A process according to claim 4 further comprising:

feeding a series of said flexible containers on to said support surface at a first angular position of said support member so that a peripheral portion of the flexible base of each container engages one of said sealing members;

removing said series of said flexible containers from said support surface at a second angular position of said support member spaced from said first angular position, said support member rotating so as to carry said flexible containers from said first angular position to said second angular position;

carrying out steps (c) and (d) adjacent said first angular position;

thereafter carrying out step (e) and continuously monitoring said characteristic to carry out step (f).

6. A process according to claim 5 wherein said pressure varying means is arranged to receive a signal from said monitoring means during step (d) so that if a monitoring means detects that no container is present adjacent a specific sealing member, sub-atmospheric pressure is not applied to the aperture associated with that sealing member.

7. Apparatus for testing the fluid tightness of a plastic container, the plastic container comprising a container body at least partially filled with a fluid and having a flexible base, and walls defining an aperture in the container body, the plastic container further comprising a flexible lid secured to the container body so as to substantially close the aperture therein, the flexible lid being spaced from the flexible base of the container body, the apparatus comprising:

a support member having a substantially horizontal support surface on which the plastic container can rest and at least one aperture extending from an entrance on said support surface through said support member;

a sealing member surrounding said entrance and arranged to sealingly engage a peripheral portion of the flexible base of the container to form a chamber defined by a predetermined portion of the base of said container and said sealing member, said chamber being in communication with said aperture, but leave the flexible lid free to move in response to pressure changes within the container;

pressure varying means for varying the pressure in said aperture between substantially atmospheric pressure and a sub-atmospheric pressure without changing the pressure applied to the outer surface of the flexible lid, thereby causing a deformation of the flexible base and thus a reduction in the pressure within the plastic container; and area detector means for monitoring a predetermined characteristic of a sampling area of the flexible lid, said sampling area having finite dimensions such that the signal from said area detector means represents the behavior of said flexible lid integrated over said sampling area.

8. Apparatus according to claim 7 wherein said support surface of said support member has a recess formed therein, said sealing member is accommodated within an outer portion of said recess and said aperture is provided within a central portion of said recess surrounded by said sealing member.

9. Apparatus according to claim 8 wherein said sealing member has an exposed surface which is substantially planar and substantially flush with the portion of said support surface surrounding said aperture so that said flexible container can be engaged with the sealing member by sliding said flexible container across said support surface.

10. Apparatus according to claim 7 wherein said support member is rotatable and has a plurality of apertures therein, each aperture having a sealing member associated therewith, each aperture also having associated therewith a monitoring means arranged to effect said monitoring, said monitoring means being arranged to rotate with said support member so as to remain in the same position relative to its associated aperture as said support member rotates.

11. Apparatus process according to claim 10 wherein said pressure varying means is arranged to receive a signal from said monitoring means so that if a monitoring means detects that no container is present adjacent a specific sealing member, sub-atmospheric pressure is not applied to the aperture associated with that sealing member.

* * * * *